United States Patent
Kim et al.

(10) Patent No.: US 9,813,208 B2
(45) Date of Patent: Nov. 7, 2017

(54) METHOD AND DEVICE FOR TRANSMITTING SOUNDING REFERENCE SIGNAL IN COOPERATIVE COMMUNICATION SYSTEM

(71) Applicant: Samsung Electronics Co., Ltd., Gyeonggi-do (KR)

(72) Inventors: Ki-Il Kim, Gyeonggi-do (KR); Youn-Sun Kim, Gyeonggi-do (KR); Hyo-Jin Lee, Seoul (KR); Hyoung-Ju Ji, Seoul (KR); Ju-Ho Lee, Gyeonggi-do (KR); Joon-Young Cho, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 14/375,777

(22) PCT Filed: Jan. 22, 2013

(86) PCT No.: PCT/KR2013/000506
§ 371 (c)(1),
(2) Date: Jul. 30, 2014

(87) PCT Pub. No.: WO2013/115515
PCT Pub. Date: Aug. 8, 2013

(65) Prior Publication Data
US 2014/0376482 A1    Dec. 25, 2014

(30) Foreign Application Priority Data

Jan. 30, 2012 (KR) ........................ 10-2012-0009245

(51) Int. Cl.
*H04W 4/00*     (2009.01)
*H04L 5/00*     (2006.01)
(Continued)

(52) U.S. Cl.
CPC ........... *H04L 5/0048* (2013.01); *H04B 7/024* (2013.01); *H04L 5/005* (2013.01); *H04L 5/0035* (2013.01);
(Continued)

(58) Field of Classification Search
CPC ..... H04L 5/0048; H04L 5/0037; H04L 5/005; H04W 52/146; H04W 52/04; H04W 76/025; H04B 7/024
See application file for complete search history.

(56) References Cited

U.S. PATENT DOCUMENTS

2009/0181687 A1\* 7/2009 Tiirola ................ H04L 27/2613
455/450
2009/0238241 A1\* 9/2009 Hooli ................... H04B 1/7143
375/133
(Continued)

FOREIGN PATENT DOCUMENTS

KR    10-2010-0091870    8/2010
KR    10-2011-0051969    5/2011
(Continued)

OTHER PUBLICATIONS

International Search Report dated Apr. 22, 2013 in connection with International Patent Application No. PCT/KR2013/000506, 7 pages.
(Continued)

*Primary Examiner* — Gregory Sefcheck
*Assistant Examiner* — Jael Ulysse

(57) ABSTRACT

Disclosed is a method for transmitting a sounding reference signal (SRS) in a cooperative communication system. The method comprises receiving, from a macro base station, SRS resource information indicating transmission resources of an SRS to be transmitted by a user equipment (UE); transmitting the SRS and uplink data based on a UE-specific SRS subframe configuration included in the SRS resource infor-
(Continued)

mation when the SRS resource information includes the UE-specific SRS subframe configuration information; and transmitting the SRS and the uplink data based on a pre-stored cell-specific SRS subframe configuration when the SRS resource information does not include the UE-specific SRS subframe configuration information. When a destination of the SRS to be transmitted by the UE is selected as a base station related to the macro base station, the SRS resource information includes the UE-specific SRS subframe configuration information of the base station selected as the destination of the SRS.

13 Claims, 11 Drawing Sheets

(51) Int. Cl.
    *H04B 7/024*     (2017.01)
    *H04W 52/32*     (2009.01)
    *H04W 52/14*     (2009.01)
    *H04B 7/06*     (2006.01)
    *H04W 88/08*     (2009.01)
    *H04L 27/26*     (2006.01)

(52) U.S. Cl.
    CPC .......... *H04L 5/0051* (2013.01); *H04L 5/0094* (2013.01); *H04W 52/325* (2013.01); *H04B 7/0619* (2013.01); *H04L 5/0032* (2013.01); *H04L 27/2613* (2013.01); *H04W 52/146* (2013.01); *H04W 88/085* (2013.01)

(56) References Cited

U.S. PATENT DOCUMENTS

| | | | | |
|---|---|---|---|---|
| 2010/0040005 | A1* | 2/2010 | Kim | H04W 72/1284 370/329 |
| 2010/0103902 | A1* | 4/2010 | Kim | H04L 5/0048 370/330 |
| 2010/0118730 | A1* | 5/2010 | Tanaka | H04L 1/0028 370/252 |
| 2010/0226324 | A1* | 9/2010 | Lee | H04W 48/08 370/329 |
| 2010/0234037 | A1* | 9/2010 | Terry | H04L 1/0023 455/450 |
| 2011/0098054 | A1* | 4/2011 | Gorokhov | H04B 7/024 455/452.1 |
| 2011/0134774 | A1* | 6/2011 | Pelletier | H04W 52/365 370/252 |
| 2011/0268028 | A1* | 11/2011 | Stern-Berkowitz | H04L 5/0048 370/328 |
| 2011/0274071 | A1 | 11/2011 | Lee et al. | |
| 2012/0176977 | A1* | 7/2012 | Gao | H04L 5/0051 370/329 |
| 2012/0207105 | A1* | 8/2012 | Geirhofer | H04L 5/0032 370/329 |
| 2012/0224556 | A1 | 9/2012 | Yoon et al. | |
| 2012/0281554 | A1* | 11/2012 | Gao | H04W 48/12 370/252 |
| 2012/0281555 | A1* | 11/2012 | Gao | H04L 1/0031 370/252 |
| 2013/0016705 | A1* | 1/2013 | Zhang | H04L 5/0048 370/336 |
| 2013/0051240 | A1* | 2/2013 | Bhattad | H04L 5/005 370/241 |
| 2013/0077574 | A1* | 3/2013 | Ekpenyong | H04L 5/0023 370/329 |
| 2013/0128855 | A1* | 5/2013 | Noh | H04W 72/0453 370/329 |
| 2015/0333886 | A1* | 11/2015 | Seo | H04L 5/0051 370/329 |

FOREIGN PATENT DOCUMENTS

KR    10-2011-0133448    12/2011
KR    10-2011-0134262    12/2011

OTHER PUBLICATIONS

Written Opinion of International Searching Authority dated Apr. 22, 2013 in connection with International Patent Application No. PCT/KR2013/000506, 9 pages.

* cited by examiner

| Value of SRS request field | Description | Virtual Cell ID for SRS base sequence initialization | SRS Power Control Parameters |
|---|---|---|---|
| '00' | Notype 1 SRS trigger | | |
| '01' | The 1st SRS parameter set configured by higher layers | a first base sequence virtual cell ID | Power control reference #1 |
| '10' | The 2nd SRS parameter set configured by higher layers | a second base sequence virtual cell ID | Power control reference #2 |
| '11' | The 3rd SRS parameter set configured by higher layers | a third base sequence virtual cell ID | Power control reference #3 |

FIG.10

METHOD AND DEVICE FOR TRANSMITTING SOUNDING REFERENCE SIGNAL IN COOPERATIVE COMMUNICATION SYSTEM

CROSS-REFERENCE TO RELATED APPLICATIONS

The present application claims priority under 35 U.S.C. §365 to International Patent Application No. PCT/KR2013/000506 filed Jan. 22, 2013, entitled "METHOD AND DEVICE FOR TRANSMITTING SOUNDING REFERENCE SIGNAL IN COOPERATIVE COMMUNICATION SYSTEM". International Patent Application No. PCT/KR2013/000506 claims priority under 35 U.S.C. §365 and/or 35 U.S.C. §119(a) to Korean Patent Application No. 10-2012-0009245 filed Jan. 30, 2012 and which are incorporated herein by reference into the present disclosure as if fully set forth herein.

TECHNICAL FIELD

The present disclosure relates to a wireless communication system, and more particularly, to a method and a device for transmitting a Sounding Reference Signal (hereinafter, referred to as SRS) in a Cooperative Multi-Point (CoMP) system where a plurality of base stations cooperatively support a transmission of a terminal (may be referred to as a User Equipment (UE) or a Mobile Station (MS)).

BACKGROUND ART

From the early stage of providing voice-oriented services, a mobile communication system has evolved into a high-speed, high-quality wireless packet data communication system to provide data and multimedia services. Various mobile communication standards such as High Speed Downlink Packet Access (HSDPA) and High Speed Uplink Packet Access (HSUPA), Long Term Evolution (LTE), Long Term Evolution-Advanced (LTE-A), High Rate Packet Data (HRPD) of the 3rd Generation Partnership Project-2 (3GPP2), and IEEE 802.16 have recently been developed to support high-speed, high-quality wireless packet data communication services. In particular, the LTE system, which is a system developed to efficiently support high speed wireless packet data transmission, maximizes wireless system capacity by using various wireless access technologies. The LTE-A system, which is an advanced wireless system evolved from the LTE system, has enhanced data transmission capability as compared to the LTE system.

The existing 3rd generation wireless packet data communication systems, such as HSDPA, HSUPA and HRPD, use technologies of an Adaptive Modulation and Coding (AMC) method and a channel-sensitive scheduling method to improve the transmission efficiency. With the use of the AMC method, a transmitter can adjust the amount of transmission data according to the channel state. That is, when the channel state is not good, the transmitter can reduce the amount of transmission data to adjust the reception error probability to a desired level. In contrast, when the channel state is good, the transmitter can increase the amount of transmission data to achieve efficient transmission of a large quantity of information while adjusting the reception error probability to a desired level.

With the use of the channel-sensitive scheduling-based resource management method, the transmitter selectively provides a service to a user having a good channel state among a plurality of users, thus increasing the system capacity compared to the method of assigning a channel to one user and providing a service to the user with the assigned channel. Such a capacity increase as in the above description is referred to as "multi-user diversity gain". In short, the AMC method and the channel-sensitive scheduling method are methods that allow a transmitter to apply an appropriate modulation and coding technique at a point of time that is determined to be most efficient based on partial channel state information fed back from a receiver.

When the AMC method is used along with a Multiple Input Multiple Output (MIMO) method, the AMC method may include a function of determining a number of a spatial layer or a rank of a transmitted signal. In this case, in order to determine optimal data rate, the AMC method considers which number of layers is used in transmitting the signal by using the MIMO rather than simply considering a coding rate and a modulation manner.

In the wireless communication system, as one of technologies for improving an uplink performance, a multiple antenna method is applied. As a representative example, the LTE, which is a next generation mobile communication system of asynchronous cellular mobile communication standard group 3GPP, also improve a performance through a space diversity gain in an uplink by applying an antenna selective transmission diversity in the uplink based on a Single Carrier Frequency Division Multiple Access (SC-FDMA). In addition, the UE transmits the SRS so that the base station obtains information with respect to the uplink, the base station receives the SRS to obtain the channel state information with respect to the uplink bandwidth, and performs a frequency selective scheduling, a power control, a timing estimation and an MCS level selection base on the obtained channel state information. In addition, the base station may obtain downlink channel state information by using the SRS. In a Time Division Duplex (TDD) system, when a channel reversibility (i.e. a channel reciprocity) characteristic is used, the downlink channel may be estimated from the uplink channel information obtained through the SRS. Also, in a Frequency Division Duplex (FDD) system, long-term channel information of the downlink may be obtained through the SRS.

In the LTE system, the UE enables the base station to obtain the uplink channel information by transmitting the SRS. When the channel reversibility (i.e. the channel reciprocity) is used, the base station may estimate the downlink channel information from the SRS.

Meanwhile, an evolved communication system such as the LTE, may support a Central Antenna System (CAS) where an antenna in each of cells is disposed in a central area of a corresponding cell and a Distributed Antenna System (DAS) where a transmission/reception antenna is disposed in a central area of the cell and a plurality of distributed antennas are disposed in different areas in the cell, in each of the cells. In the existing system, one base station may transmit the downlink data and receive the uplink data, but in the CoMP system where the distributed antennas are disposed, the downlink data transmission and the uplink data transmission may be performed in different base stations or different antennas. In particular, when the SRS transmission is performed in different base stations or the different antennas, a macro base station may not receive the SRS transmitted by the UE. Thus, in the CoMP system using the distributed antenna, it is necessary to optimize the SRS transmission according to a destination of the SRS.

DETAILED DESCRIPTION OF THE DISCLOSURE

Technical Problem

The present disclosure provides a method and a device effectively forming an SRS subframe for transmitting an SRS of a UE in a CoMP system.

The present disclosure provides operations of a base station and a UE and a device for effectively forming an SRS in a CoMP system.

Technical Solution

A method, according to an exemplary embodiment of the present disclosure, is for transmitting a Sounding Reference Signal (SRS) in a cooperative communication system. The method includes receiving SRS resource information indicating a transmission resource of an SRS to be transmitted by a user equipment (UE), from a macro base station, transmitting the SRS and uplink data based on a UE-specific SRS subframe configuration included in the SRS resource information when the SRS resource information includes UE-specific SRS subframe configuration information, and transmitting the SRS and the uplink data based on a pre-stored cell-specific SRS subframe configuration when the SRS resource information does not include the UE-specific SRS subframe configuration information. Here, a destination of the SRS to be transmitted by the UE is selected as a first base station related to the macro base station, the SRS resource information includes the UE-specific SRS subframe configuration information of the first base station selected as the destination of the SRS.

A method, according to another exemplary embodiment of the present disclosure, is for supporting a transmission of a Sounding Reference Signal (SRS) in a cooperative communication system. The method includes generating SRS resource information not including User Equipment-specific (UE-specific) SRS subframe configuration information, when a destination of the SRS is selected as a macro base station, generating SRS resource information including the UE-specific SRS subframe configuration information of a first base station selected as the destination of the SRS, when the destination of the SRS to be transmitted by the UE is selected as the first base station related to the macro base station; transmitting the SRS resource information to the UE, and receiving at least one of the SRS and uplink data from the UE based on the SRS resource information.

A method, according to another exemplary embodiment of the present disclosure, is for supporting a transmission of a Sounding Reference Signal (SRS) in a cooperative communication system. The method includes determining SRS parameters for transmitting the SRS, based on Cooperative Multi-Point (CoMP) set information indicating cells participated in a CoMP communication to User Equipments (UEs), determining SRS power control parameters for the SRS according to at least one of power control parameters and additional power control parameters used in transmitting uplink data, according to whether the SRS is transmitted to a base station to which the uplink data is transmitted or the SRS is transmitted to a base station to which the uplink data is not transmitted, determining a virtual cell ID for setting an initial value of an SRS base sequence forming the SRS, and informing the SRS parameters, the virtual cell ID and the SRS power control parameters to the UE.

A method, according to another exemplary embodiment of the present disclosure, is for transmitting a Sounding Reference Signal (SRS) in a cooperative communication system. The method includes receiving information with respect to SRS parameters, a virtual cell ID and SRS power control parameters for transmitting the SRS, from a base station, and transmitting the SRS according to the received information. Here, the SRS parameters are determined based on Cooperative Multi-Point (CoMP) set information indicating cells participated in a CoMP communication to User Equipments (UEs), the SRS power control parameters are determined by at least one of the power control parameters and additional power control parameters used in transmitting uplink data, according to whether the SRS is transmitted to a base station to which the uplink data is transmitted or the SRS is transmitted to a base station to which the uplink data is not transmitted, and the virtual cell ID is used for setting an initial value of an SRS base sequence forming the SRS.

Advantageous Effects

According to the exemplary embodiments described in the present disclosure, a base station reorganizes an SRS subframe in consideration of a distributed antenna environment related to a UE in a CoMP system. Therefore, an uplink data transmission rate may be increased by minimizing a subframe in which the UE does not transmit data. In addition, the present disclosure may effectively transmit data by forming a plurality of SRSs according to a channel environment of a UE, a base station and a distributed antenna in the CoMP system.

BRIEF DESCRIPTION OF THE DRAWINGS

FIG. 10 is a view for describing an SRS parameter setting when an SRS is non-periodically transmitted according to an exemplary embodiment;

MODE FOR CARRYING OUT THE DISCLOSURE

Hereinafter, an operation principle of the present disclosure will be described in detail with reference to the accompanying drawings. In the following description of embodiments of the present disclosure, a detailed description of known functions or configurations incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be determined based on the contents throughout the specification.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

An exemplary embodiment of the present disclosure increases a transmission capacity of an uplink, by forming a Sounding Reference Signal (SRS) subframe so that a resource of an SRS is effectively distributed to distributed antennas in consideration of a User Equipment-specific (UE-specific) channel state and an adjacent distributed antenna in a Cooperative Multi-Point (CoMP) system supporting a transmission of a UE by a cooperation of a plurality of base stations. In addition, in the exemplary embodiment of the present disclosure, the UE may set a plurality of parameters according to a destination.

Figure 1:
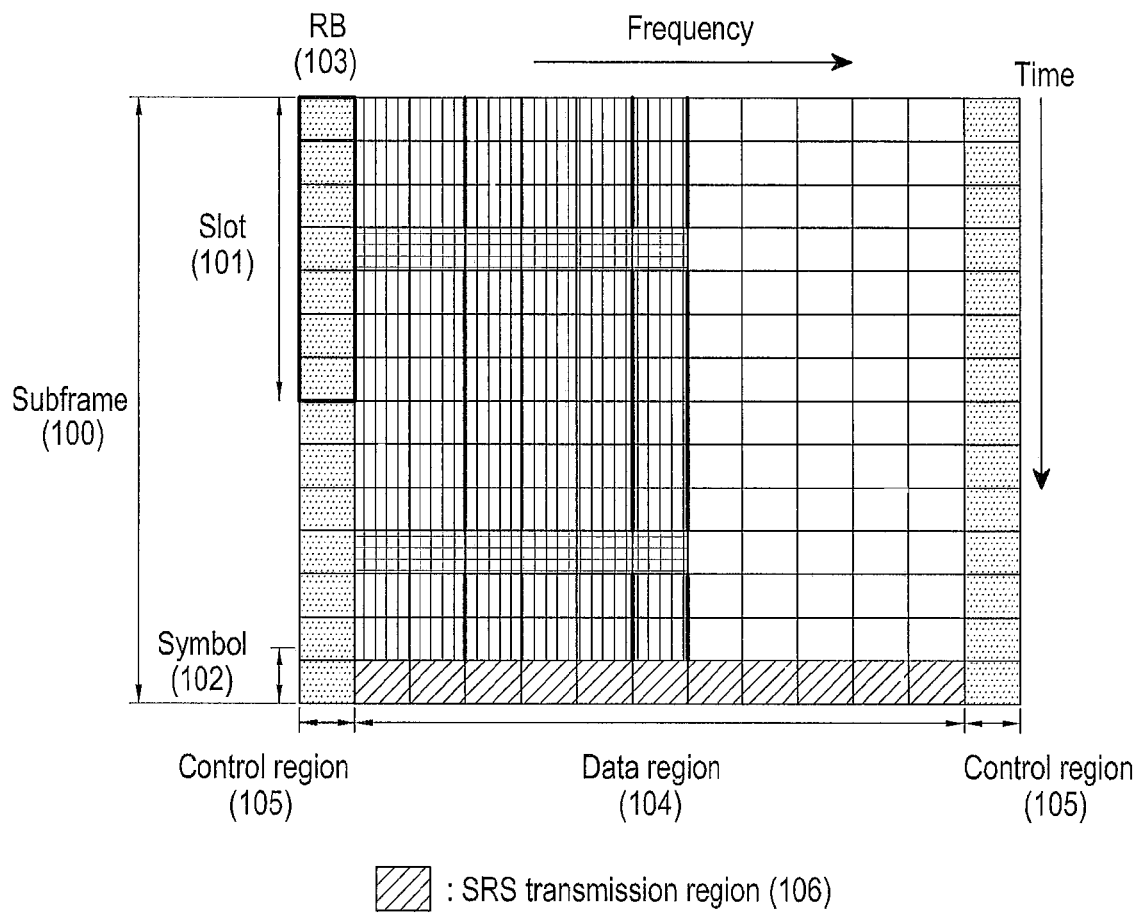
FIG. 1 is a view illustrating a transmission structure of an LTE uplink system.

FIG. 1 illustrates an uplink transmission structure of a Long Term Evolution (LTE) system.

Referring to FIG. 1, a subframe 100 having a length of 1 ms which is a basic unit of the LTE uplink transmission includes two 0.5 ins of slots 101. For example, each of the slots includes seven symbols 102, and one symbol correspond one SC-FDMA symbol. A resource block RB 103 is a resource assignment unit corresponding to twelve subcarriers in a frequency domain, and is a resource assignment unit corresponding to one slot in a time domain.

The LTE uplink transmission structure is largely divided into a data area 104 and a control area 105. Here, the data area 104 means a series of communication resources including data such as a voice, a packet and so on transmitted to each of the UEs, and corresponds to resources except for the control area 105 in the subframe 100. The control area 105 means a series of communication resources including a channel quality report from each of the UEs, reception ACK/NACK with respect to a downlink signal, an uplink scheduling request and so on.

As an example shown in FIG. 1, a time when the SRS is transmitted in the one subframe is only the last SC-FDMA symbol period, and uses a data transmission bandwidth on the frequency domain. The SRSs of the plurality of UEs transmitted to the last SC-FDMA of the same subframe may be classified according to a frequency position.

The SRS is formed with a Constant Amplitude Zero Auto Correlation (CAZAC) sequence. The SRSs transmitted from the plurality of UEs are the CAZAC sequences having cyclic shift values different from each other. Each of the CAZAC sequences has a characteristic of having a zero correlation value with respect to other sequences having cyclic shift values different from that of each of the CAZAC sequences. By using such a characteristic, the SRSs of the same frequency domain may be classified according to the CAZAC sequence cyclic shift value.

In a case wherein the base station receives the SRS from the UE, when other UEs transmit data on a Physical Uplink Shared Channel (PUSCH) to the same SC-FDMA symbol in which the SRS is included, the base station may receive interference in receiving the SRS. In order to prevent this, the base station informs information, with respect to a cell-specific SRS subframe configuration in which an SRS transmission may be assigned, to the UE. The UE does not transmit the PUSCH data in the last SC-FDMA symbol, when there is no SRS to be transmitted by the UE and the UE transmits the PUSCH data in a subframe set according to the cell-specific subframe configuration, too.

Figure 2:
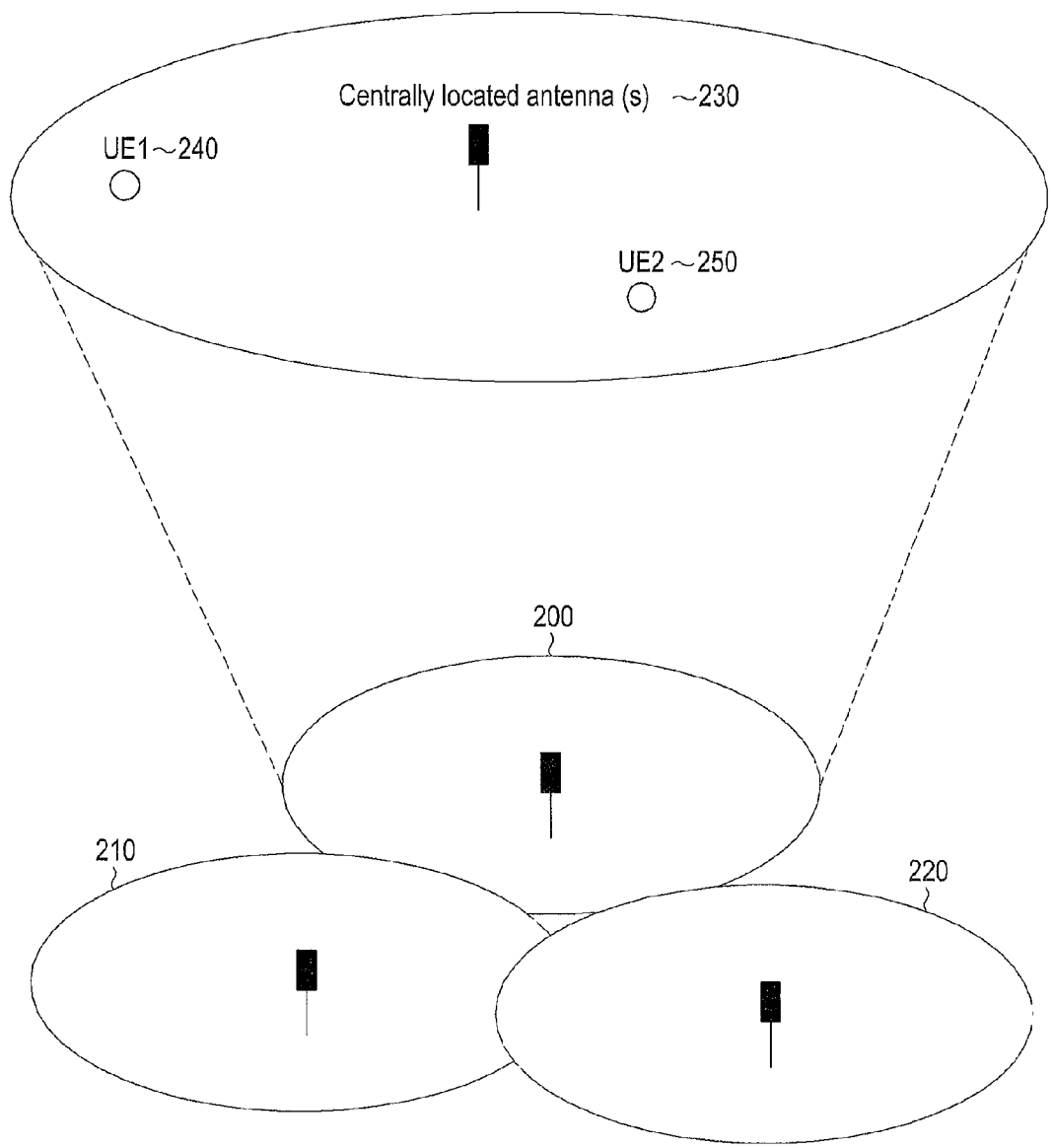
FIG. 2 is a view illustrating a structure of a cellular mobile communication system in which a central antenna is disposed.

FIG. 2 is a view illustrating a structure of a mobile communication system in which a central antenna is disposed. In the shown example, a transmission/reception antenna is disposed in central portions of each of the cells, in the mobile communication system including three cells.

Referring to FIG. 2, in a first cell 200 among the first cell 200, a second cell 210 and a third cell 220, a central antenna 230 positioned in a central area of the first cell 200, a first UE (or MS) 240 and a second UE 250 are disposed. The central antenna 230 provides a mobile communication service to the two UEs 230 and 240 positioned in the first cell 200. A distance between the first UE 240, receiving the mobile communication service by using the central antenna 230, and the central antenna 230 is farther than a distance between the second UE 250 and the central antenna 230. Thus, a data transmission speed supported to the first UE 250 is lower than that of the second UE 250.

The mobile communication system shown in FIG. 2 has a Central Antenna System (CAS) type in which the antenna included in each of the cells is disposed in the central area of the corresponding cell. In the case of the CAS, although a plurality of the antenna are disposed in the cells, respectively, each of the antennas is disposed in the central area of the cell and is operated to perform a communication with respect to a service area of the cell.

In the mobile communication system, a Reference Signal (RS) (or a pilot) is transmitted in order to measure a downlink channel state in each of the cells. In a case of an LTE-Advanced (LTE-A) system of a 3rd Generation Partnership Project (3GPP), a UE measures a channel state between the base station and the UE by using a Channel Status Information-Reference Signal (CSI-RS) transmitted by the base station. When the antennas in each of the cells are disposed and operated in the CAS type, as shown in FIG. 2, the RS may be transmitted through the central antenna, and the UEs may receive the RS through the central antenna.

In general, the longer a transmission path of a signal to be transmitted is, the lower reception quality of the signal is. Therefore, a plurality of base station distributed antennas is disposed in the cell, an optimal base station distributed antenna is selected according to a position of the UE, and thus the mobile communication service is provided. Thus, a data transmission speed rate may be improved.

Figure 3:
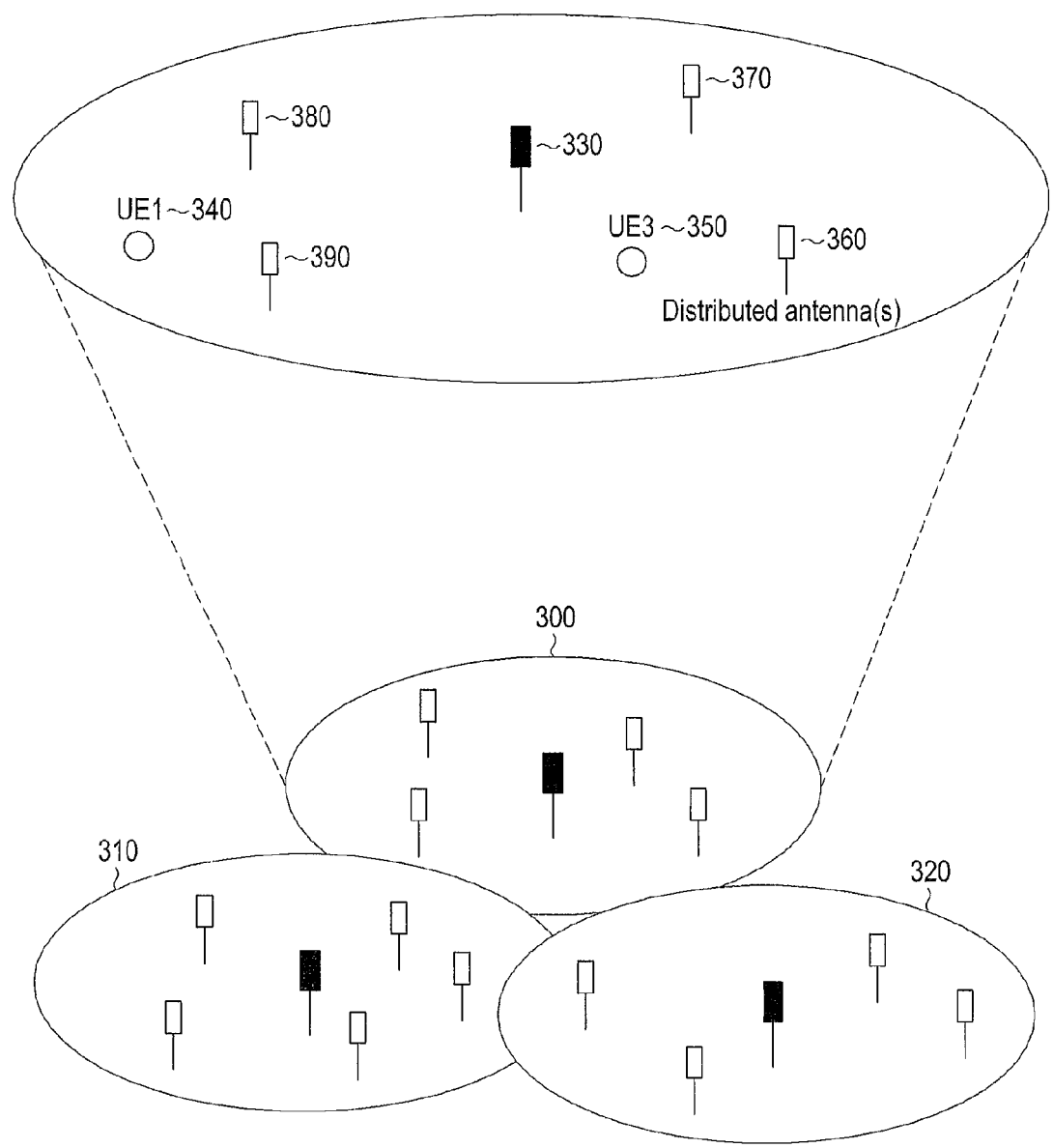
FIG. 3 is a view illustrating an example of a system configuration in which a central antenna and a distributed antenna are included in a cellular mobile communication system.

FIG. 3 is a view illustrating an example of a system configuration in which a central antenna and a distributed antenna are included in a mobile communication system. In the shown example, a transmission/reception antenna is disposed in each of cells and a plurality of distributed antennas is disposed in different positions in the cell, in the mobile communication system including three cells.

Referring to FIG. 3, in a first cell 300 among the first cell 300, a second cell 310 and a third cell 320, a central antenna 330 positioned in a central area of the first cell 300, a first UE (or MS) 330, a second UE 350, a first distributed antenna 360, a second distributed antenna 370, a third distributed antenna 380 and a fourth distributed antenna 390 are disposed. The central antenna 330 and the plurality of distributed antennas 360, 370, 380 and 390 are connected, and are controlled by a central control device (not shown). Here, each of the central antenna 330 and the plurality of distributed antennas 360, 370, 380 and 390 may be an antenna array including a plurality of antenna elements.

The central antenna 330 provides the mobile communication service to all of the UEs positioned in the first cell 300. However, a distance between the first UE 340, receiving the mobile communication service by using the central antenna 330, and the central antenna 330 is farther than a distance between the second UE 350 and the central antenna 330. Thus, a data transmission speed supported to the first UE 350 through the central antenna 330 is lower than that of the second UE 350.

For example, with respect to the first UE 340, the best channel environment is formed between the first UE 340 and the fourth distributed antenna 390, and thus the first UE 340 communicates with the fourth distributed antenna 390 to receive comparatively higher speed data service. In addition, with respect to the second UE 350, the best channel environment is formed between the second UE 350 and the first distributed antenna 360, and thus the second UE 350 communicates with the first distributed antenna 360 to receive comparatively higher speed data service.

In this case, the central antenna 330 supports a general mobile communication service and mobility between cells of the UE, except of the high speed data service.

The central antenna and the distributed antennas may be formed as independent cells having different cell IDs, respectively. Alternatively, the central antenna and the distributed antennas may be operated as one cell having one cell ID. When the central antenna and the distributed antennas have different cell IDs, respectively, the UE may distinguish a signal from the central antenna and the distributed antenna based on the cell ID. In contrast, when the central antenna and the distributed antenna are operated with one cell ID, the UE distinguish the signal from the central antenna and the distributed antenna based on additional information provided from the base station. The cell mentioned in the specification means a data transmission area capable of providing a service of a specific transmission point. Each of the antennas means a Remote Radio Head (RRH) having a cell ID equal to a cell ID of the macro base station in a macro area, or may correspond to a macro or pico base station having cell IDs different from each other.

The central control device means a device capable of transmitting or receiving data to or from the UE and processing the transmitted or received data. Here, when each of the transmission points are the RRH having an cell ID equal to the cell ID of the base station, the macro base station may be referred to as the central control device. In contrast, when each of the antennas corresponds to the macro or pico cell having the different cell IDs, a device combining and managing each of the cells may be referred to as the central control device.

In the LTE system, the UE enables the base station to obtain uplink channel information, by transmitting the SRS. When a channel reversibility characteristic is used, the base station may estimate downlink channel information from the SRS. In the conventional system, downlink data may be transmitted and uplink data may be received in one base station. But, a downlink transmission and an uplink data transmission may be performed in different base stations or different antennas, in the CoMP system in which the distributed antenna is disposed.

Figure 4:
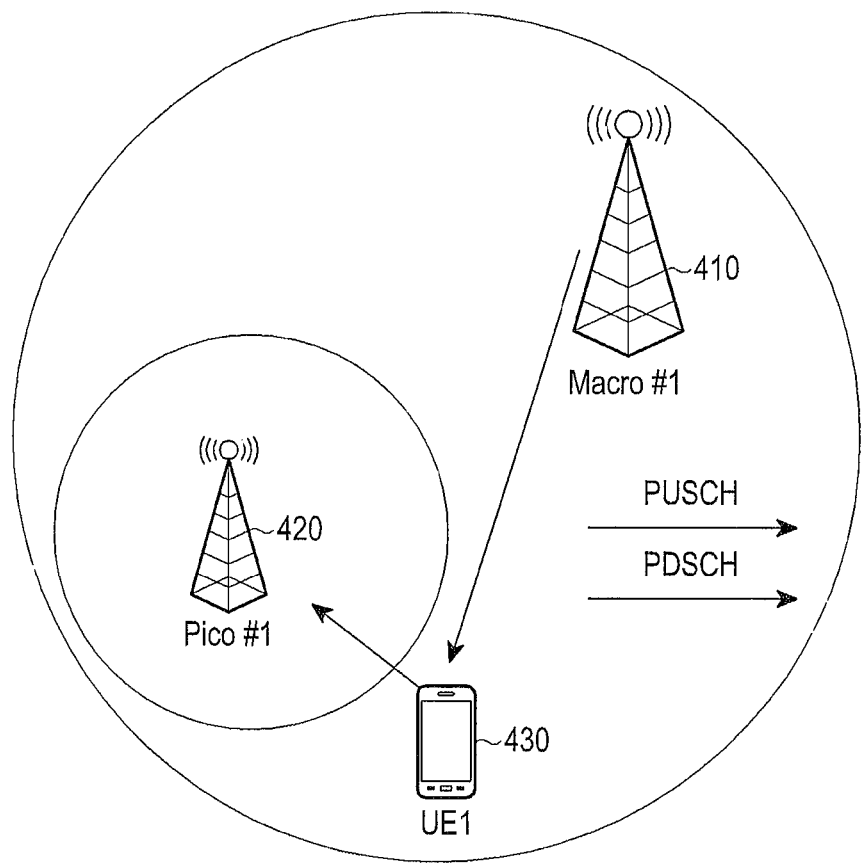
FIG. 4 illustrates an environment wherein a UE communicates with different base stations in a downlink and an uplink in a cellular mobile communication system.

FIG. 4 illustrates an environment wherein a UE communicates with different base stations in a downlink and an uplink in a cellular mobile communication system.

Referring to FIG. 4, a UE 430 receives downlink data from a macro base station 410. This is because a transmission antenna power of the macro base station 410 is larger than that of a pico base station 420, and thus a reception signal strength from the macro base station 410 may be stronger than that from the pico base station 420 in respect to a reception power, although a distance between the UE 430 and the pico station 420 is shorter than that between the UE 430 and the macro base station 410 in respect to a distance. However, it may be preferable that the pico base station 420 adjacent to the UE receives the uplink data transmitted from the UE 430.

During the downlink transmission, the macro base station 410 and the pico base station 420 may cooperatively transmit the downlink data to the UE 430. To this end, when each of the base stations 410 and 420 tries to obtain downlink channel information by using the SRS, the macro base station 410 cannot obtain the downlink channel information from the SRS transmitted, for obtaining uplink channel information, to the pico base station 420 from the UE 430. This is because the SRS transmitted from the UE 430 to the pico base station 420 is transmitted based on the distance between the UE 430 and the pico base station 420 and a closed-loop power control parameter from the UE 430 to the pico base station 420 and so on, thus the macro base station 410 cannot receive the SRS transmitted by the UE. Thus, it is necessary to differentiate SRS transmission parameters according to a destination of the SRS, in the CoMP system.

Figure 5:
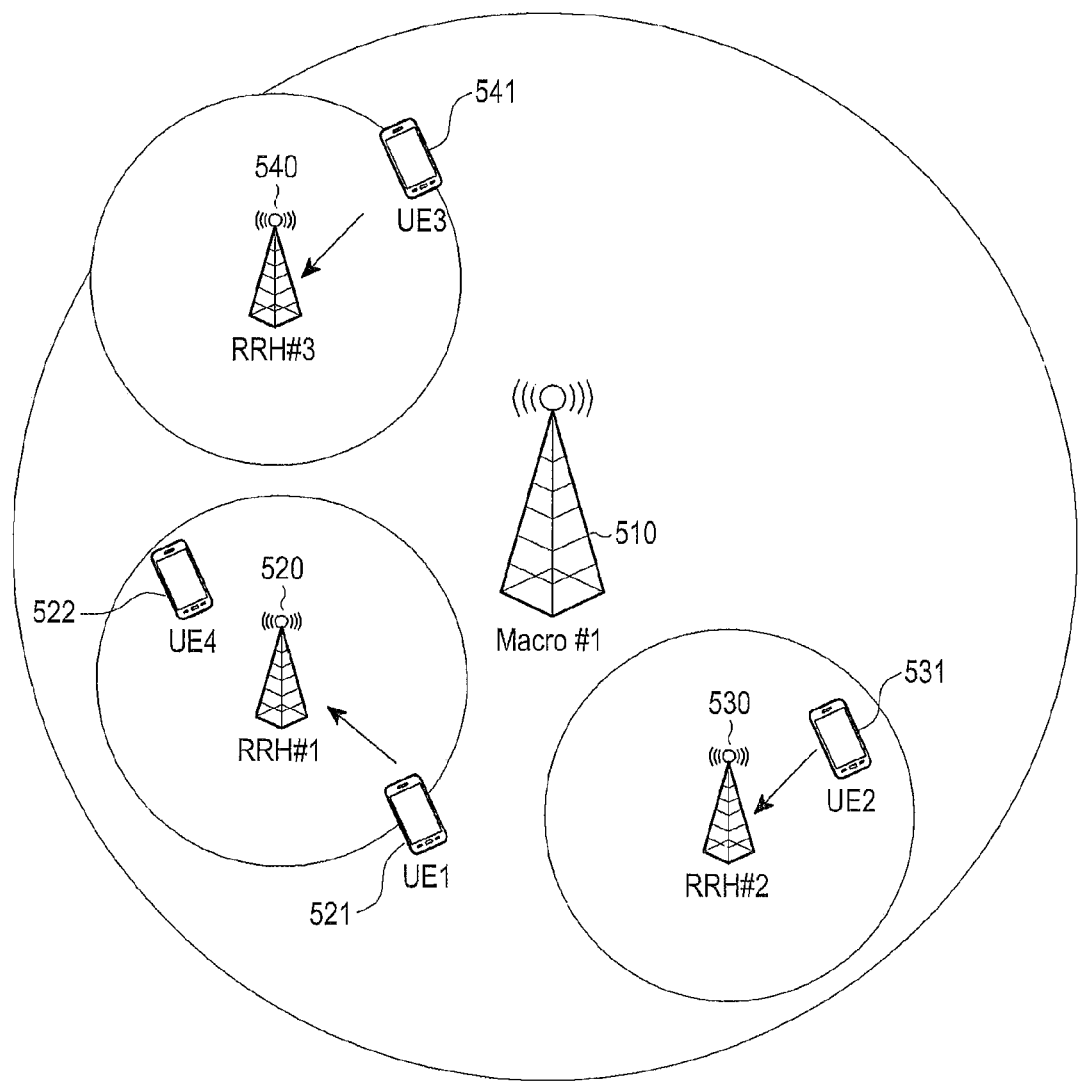
FIG. 5 is a view illustrating a structure of a cellular mobile communication system according to an exemplary embodiment of the present disclosure.

FIG. 5 is a view illustrating a structure of a cellular mobile communication system according to an exemplary embodiment of the present disclosure.

Referring to FIG. 5, a macro area includes a macro base station 510, and RRHs 520, 530 and 540 commonly having a cell ID. In a case of a cell structure where the plurality of RRHs 520, 530 and 540 are disposed in one macro area, a plurality of UEs 522, 531 and 541 may be distributed with the RRHs 520, 530 and 540 as the center, and the RRHs 520, 530 and 540 provide a high speed data transmission to the concentrated UEs 522, 531 and 541.

In a general cell-specific SRS subframe configuration, one cell includes one common configuration. Thus, the same one cell-specific SRS subframe configuration is applied to the UE 521 included in the macro base station 510 and the UEs 522, 531 and 541 included in all of the RRHs 520, 530 and 540. In this case, the cell-specific SRS subframe configuration should include frequent number of SRS transmission units so that the UEs 521, 522, 531 and 541 included in the macro area 510 and all of the RRHs 520, 530 and 540 transmits the SRS.

The SRS transmitted from the UEs 521, 522, 531 and 541 to each of the RRH 520, 530 and 540 may be set in a subframe unit. For example, the UEs 521 and 522 transmitting the SRS to a RRH#1 520 may transmit the SRS in $0^{th}$ and $5^{th}$ indexes, and the UE 531 transmitting the SRS to the RRH#2 may transmit the SRS in $1^{th}$ and 6th subframe indexes. The reason why the RRHs receive the SRS in the different subframes is for preventing interference between the transmitted SRSs. When the UEs transmit the SRS to the RRH#1 520 and the RRH#2 530 in the same subframe, the SRS transmitted to the RRH#1 520 may be received by the RRH#2 530, and thus interference may be generated in receiving the SRS transmitted to the RRH#2 530. Thus, in order to decrease the interference between the SRSs, SRS subframe configurations transmitted to each of the RRHs 520, 530 and 540 may be different from each other. In this case, the cell-specific SRS subframe should include all of the SRSs transmitted to the all of the RRHs and the macro base station 510. This is because the SRS subframe has a specific configuration in a cell ID, when macro base station 510 and the RRHs 520, 530 and 540 have the one cell ID as shown in FIG. 5.

But, when the macro base station 510 and all of the RRHs 520, 530 and 540 are set with the one cell-specific SRS subframe configuration, dissipation of a resource for transmitting the uplink PUSCH data may be generated.

Figure 6:
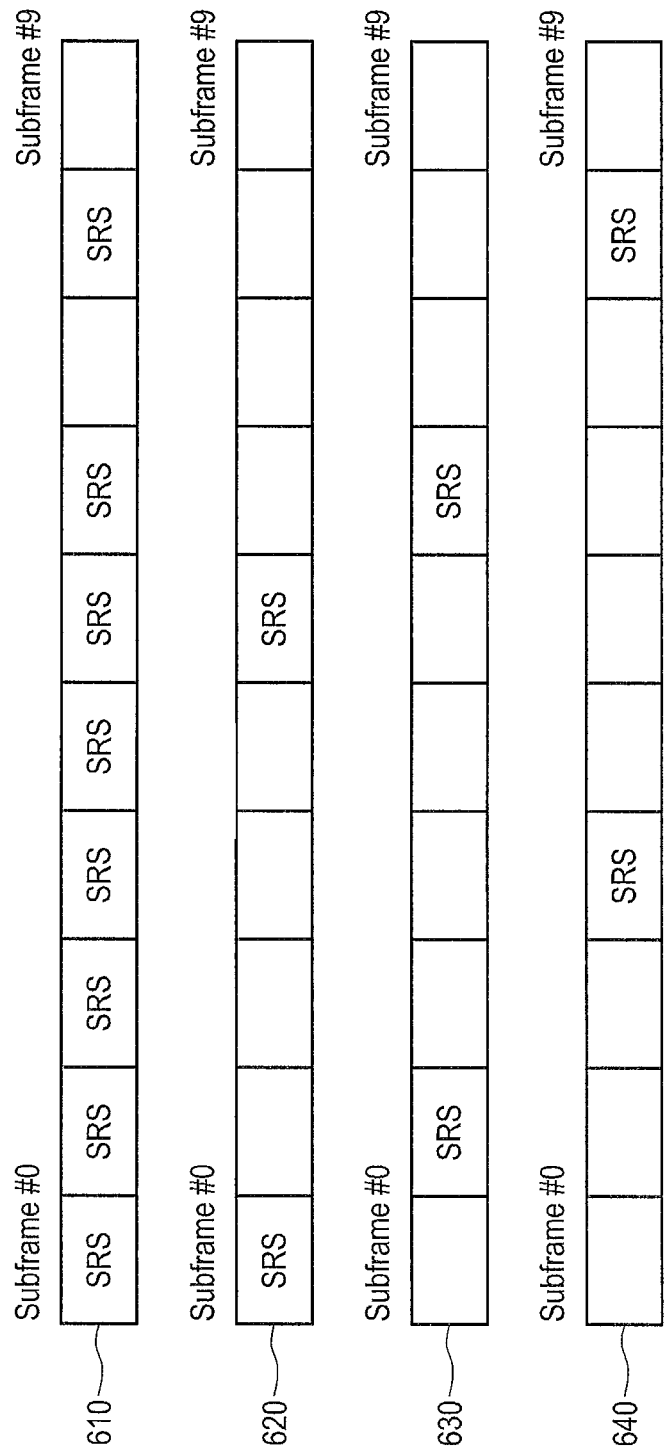
FIG. 6 is a view illustrating an SRS subframe configuration of a cellular mobile communication system.

For example, as shown in FIG. 6, when subframe indexes #0, 1, 2, 3, 4, 5, 6 and 8 among the subframe configuration 610 of the macro base station 510 are set as the cell-specific SRS subframe configuration, and the UEs 521 and 522 transmitting the SRS to the RRH#1 520 transmit the SRS in the subframe indexes #0 and #5, the UEs transmitting the PUSCH data to the RRH#1 520 cannot transmit the data to the last SC-FDMA symbol in the indexes #1, 2, 3, 4, 6 and 8.

Thus, although the SRS is not transmitted, the last SC-FDMA symbol is processed as a blank because of the cell-specific SRS subframe configuration, therefore the uplink PUSCH data is not transmitted, and thus a transmission rate of the uplink PUSCH data is decreased.

In an exemplary embodiment of the present disclosure, the transmission rate of the uplink data may be increased by decreasing abuse of an unused symbol according to the cell-specific SRS subframe configuration. Although the uplink PUSCH data is transmitted to the last SC-FDMA symbol in a subframe in which the SRS is not transmitted, the interference decreases when adjacent RRH and macro base station receive the SRS because a distance to the adjacent RRH and macro base station is far.

Figure 7:
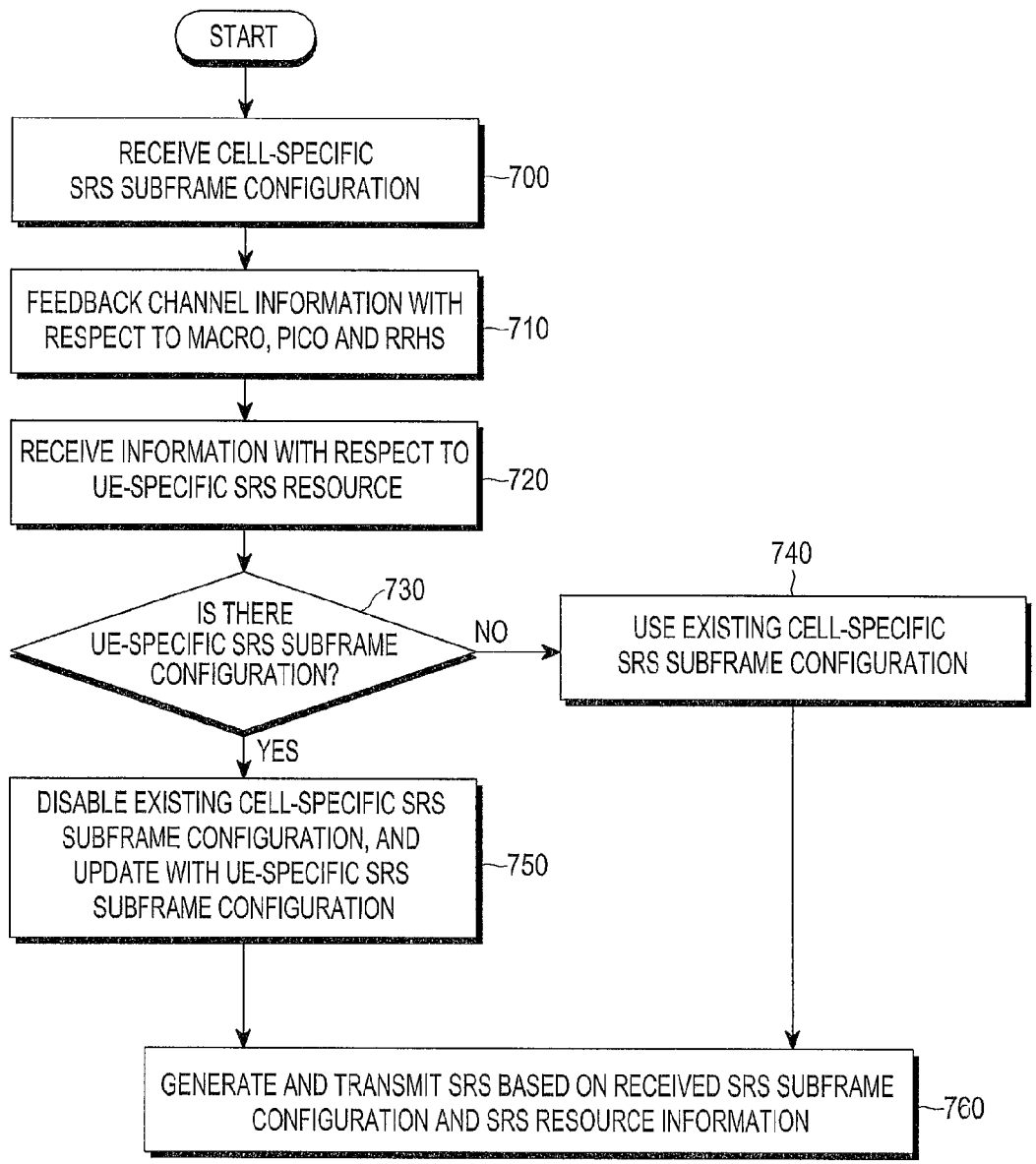
FIG. 7 is a flowchart illustrating an operation of a UE for transmitting an SRS through an exemplary embodiment of the present disclosure.

FIG. 7 is a flowchart illustrating an operation of a UE for transmitting an SRS through an exemplary embodiment of the present disclosure. Hereinafter, a base station may be a central control device, a macro base station or an RRH according to a position of the UE or uplink/downlink transmission setting.

Referring to FIG. 7, the UE receives information with respect to a cell-specific SRS subframe configuration (i.e. a cell-specific SRS subframe configuration information) in step 700. Channel quality information from the base station and the RRHs are measured according to the cell-specific SRS subframe configuration information, and the channel information according to the measured result is fed back to at least one of the macro base station and corresponding related base stations (i.e. pico base stations and/or the RRHs) in step 710. The channel information is long-term channel information, and the UE may measure information such a Reference Signal Received Power (RSRP) and feedback the information. The fed back channel information is transmitted to the central control device which may be formed with the macro base station or an additional entity, and the central control device selects the macro base station or the RRH, to which the SRS is transmitted by the UE, based on the fed back channel information.

The UE receives SRS resource information indicating a transmission resource of the SRS transmitted by the UE, froth the base station, in step 720. When the UE is selected so that UE transmits the SRS to a specific base station, the SRS resource information includes UE-specific SRS subframe configuration of a selected base station. The SRS resource information may be transmitted through a Physical Data Control Channel (PDCCH)/Enhanced PDCCH (ePDCCH) or may be transmitted through a higher layer such as a Radio Resource Control (RRC). The UE determines whether the UE-specific SRS subframe configuration information is included in the received SRS resource information, in step 730. When the UE-specific SRS subframe configuration information is not included in the received SRS resource information, the UE determines using a pre-stored cell-specific SRS subframe configuration in step 740.

In contrast, the UE-specific SRS subframe configuration information is included in the received SRS resource information, in step 750, the pre-stored cell-specific SRS subframe configuration is disregarded (i.e. disabled) and the pre-stored cell-specific SRS subframe configuration is replaced (i.e. updated) with the UE-specific SRS subframe configuration received in step 720. In step 760, the UE transmits the SRS and the PUSCH data based on the pre-stored cell-specific SRS subframe configuration or the UE-specific SRS subframe configuration received in step 720 and the SRS resource information.

At this time, the UE-specific SRS subframe configuration allows a data transmission up to the last SC-FDMA symbol when the uplink PUSCH data is transmitted in a subframe in which the SRS is not transmitted. Thus, a transmission rate of the uplink data may be increased by decreasing abuse of an unused symbol according to the cell-specific SRS subframe configuration.

For example, the cell-specific configuration is set as subframe indexes #0, 1, 2, 3, 4, 5, 6, and 8 similarly to the subframe configuration 610 in FIG. 6, the central control device generates the UE-specific SRS subframe configuration 620 instructing the transmission of the SRS in the indexes #0 and #5 to the UEs 521 and 522 transmitting the SRS to the RRH#1 520. When the central control device requests the transmission of the SRS to the RRH#1 520 based on the channel information fed back from the UE, the central control device additionally transmits the UE-specific SRS subframe configuration to the UE. When the UE receives the UE-specific SRS subframe configuration, the UE transmits the SRS and the uplink PUSCH data according to the newly received UE-specific SRS subframe configuration 620, without the use of the previous cell-specific SRS subframe configuration 610. That is, when the UE transmits the uplink PUSCH data in the subframe indexes #1, 2, 3, 4, 6 and 8 based on the UE-specific SRS subframe configuration 620, the UE may transmit the uplink PUSCH data by using up the last SC-FDMA symbol.

When the central control device changes an object to which the SRS is transmitted from the RRH#1 520 to the RRH#2 530 because the channel information of each of the macro base station 510 and the RRHs 520, 530 and 540 are changed due to a movement of the UE, the central control device may generate a new UE-specific SRS subframe configuration to provide the UE.

Figure 8:
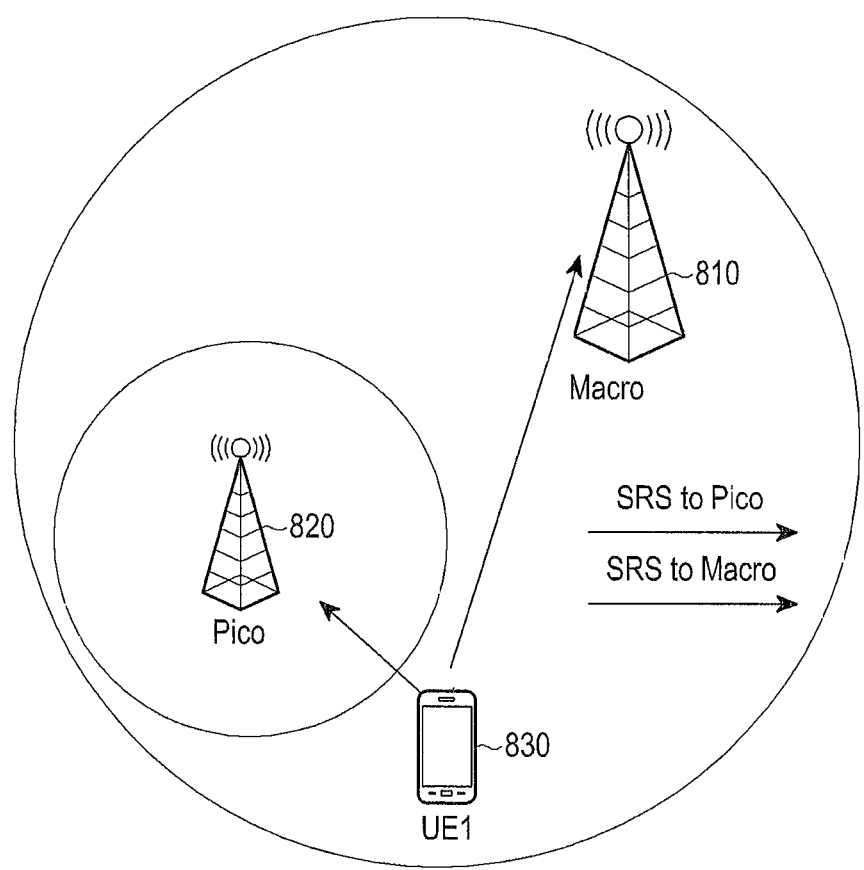
FIG. 8 is a view illustrating a structure of a cellular mobile communication system according to another exemplary embodiment of the present disclosure.

FIG. 8 is a view illustrating a structure of a cellular mobile communication system according to another exemplary embodiment of the present disclosure.

Referring to FIG. 8, a macro area includes a macro base station 810 and a pico base station 820 having cell IDs different from each other. A downlink transmission is managed by the macro base station 810, and an uplink reception is managed by the pico base station 820. When a UE 830 tries to obtain downlink channel information by using an SRS for obtaining uplink channel information to the pico base station, the macro base station 810 cannot receive the SRS transmitted by the UE 830. This is because the SRS transmitted from the UE 830 to the pico base station 820 is transmitted based on a distance between the UE 830 and the pico base station 820 and a closed loop power control parameter from the UE to the pico base station 820 and so on.

Although the SRS for the pico base station is transmitted to the macro base station 810 because a distance between the UE 830 and the macro base station 810 and a distance between the UE 830 and the pico base station 820 are similar, a sequence of the SRS is scrambled base on a cell ID, the SRS is generated and transmitted based on SRS parameters set in the pico base station 820, and thus it is difficult for the macro base station 810 to receive the SRS transmitted from the UE 830. Thus, it is necessary to set the SRS parameters so that the macro base station 810 receives the SRS from the UE 830.

In the CoMP system, different SRSs may be generated according to a destination base station. Thus, in exemplary embodiment described hereinafter, the SRS parameters are set according to the destination of the SRS.

For example, when the SRS is transmitted to the pico base station, the SRS parameters of the UE-specific SRS configuration (e.g. an srs-Bandwidth, an srs-HoppingBandwidth, a freqDomainPosition, a duration, an srs-ConfigIndex, transmissionComb, a cyclicShift and so on [refer to 3GPP TS 36.331 V10.3.0]) may be set, based on the cell-specific SRS configuration (e.g. an srs-BandwidthConfig, an srs-SubframeConfig, an ackNackSRS-SimultaneousTransmission, an srs-MaxUpPts and so on [refer to 3GPP TS 36.331 V10.3.0]) of the pico base station.

Here, the srs-BandwidthConfig indicates a bandwidth configuration for the SRS transmission of all UEs in the cell, the srs-SubframeConfig indicates the SRS subframe configuration, the ackNackSRS-SimultaneousTransmission indicates whether the SRS and ACK/NACK (AN) are simultaneously transmitted, and the srs-MaxUpPts indicates a maximum value of an uplink pilot time slot for the SRS transmission. In addition, the srs-Bandwidth indicates a bandwidth for the SRS transmission of each of the UEs, the srs-HoppingBandwidth indicates a hopping bandwidth for the SRS transmission, the freqDomainPosition indicates a point on a frequency axis for the SRS transmission, the duration indicates transmission duration of the SRS, the srs-ConfigIndex indicates an index of the SRS configuration. In the SRS transmission manner, an SRS SC-FDMA symbol is transmitted by using an interleaved FDMA of which a RePetition Factor (RPF) is two, and a signal is occupied every two subcarriers in a sounding bandwidth. The transmissionComb indicates information related to the RPF on a position of the frequency axis, and the cyclicShift indicates a cyclic shift value of sequences forming the SRS.

Additionally, the UE-specific SRS configuration may include values for setting an initial value of the SRS base sequence so that the pico base station 820 receives the SRS. In LTE/LTE-A system, the initial value of the SRS base sequence is set based on cell IDs of each of the base stations, but in the cooperative system of the plurality of base stations, the UE may set the initial value according to the SRS. For example, a virtual cell ID for setting the initial value of the SRS base sequence may be included in the UE-specific SRS configuration.

In addition, power control parameters may be included in the UE-specific SRS configuration to be used in transmitting the SRS to the pico base station. The power control parameters to be used in transmitting the SRS to the pico base station may include loss of a path from the pico base station 820 to the UE 830, a power offset ($P_{SRS\_OFFSET}$), a TPC instruction and so on. Here, TPC instruction may be related to the TPC instruction for transmitting an uplink PUSCH data, and may be an independent TPC instruction. This is related to whether the base station receiving the SRS is identical to the base station receiving the uplink PUSCH data.

As an exemplary embodiment which may be selected, when the uplink PUSCH data is transmitted from the UE to the pico base station 820 because a distance between the UE 830 and the pico base station 820 is shorter than a distance between the UE 830 and the macro base station 830, in the case of the SRS toward the pico base station, a value of the TPC instruction in the power control parameter may be a value identical to a value of the TPC instruction of the PUSCH transmitting the uplink PUSCH data.

For example, when the SRS is transmitted to the macro base station 810, the SRS parameters of the UE-specific SRS configuration (e.g. the srs-Bandwidth, the srs-HoppingBandwidth, the freqDomainPosition, the duration, the srs-ConfigIndex, the transmissionComb, the cyclicShift and so on) may be set based on the cell-specific SRS configuration (e.g. the srs-BandwidthConfig, the srs-SubframeConfig, the ackNackSRS-SimultaneousTransmission, the srs-MaxUpPts and so on) in the macro base station. Here, the virtual cell ID for setting the initial value of the SRS base sequence may be additionally set in the UE-specific SRS configuration so that the macro base station receives the SRS.

In addition, the power control parameters may be set in the UE-specific SRS configuration for transmitting the SRS. The power control parameters for transmitting the SRS from the UE to the macro base station may include loss of a path from the macro base station 810 to the UE 830, the power offset ($P_{SRS\_OFFSET}$), the TPC instruction and so on. Here, the TPC instruction may be related to the TPC instruction for transmitting the uplink PUSCH data, and may be the independent TPC instruction. This is related to whether the base station receiving the SRS is identical to the base station receiving the uplink PUSCH data.

In the present exemplary embodiment, when the uplink PUSCH data is transmitted from the UE to the pico base station 820 because the distance between the UE 830 and the pico base station 820 is shorter than the distance between the UE 830 and the macro base station 830, in the case of the SRS toward the macro base station, the value of the TPC instruction in the power control parameter is not a value identical to the value of the TPC instruction of the PUSCH transmitting the uplink PUSCH data. Thus, in the case of the SRS toward the macro base station, a power control parameter based on a new TPC instruction not related to the TPC instruction of the PUSCH transmitting the uplink PUSCH data in the power control parameter may be set.

The power control parameters except for the TPC instruction may be set in correspondence to a power control aim at the base station regardless of the power control used in transmitting the uplink PUSCH data. The UE 830 receives the plurality of SRS parameters for transmitting the SRS to the macro base station 810 and the pico base station 820, and transmits the SRS to each of the base stations according to the SRS parameters.

Figure 9:
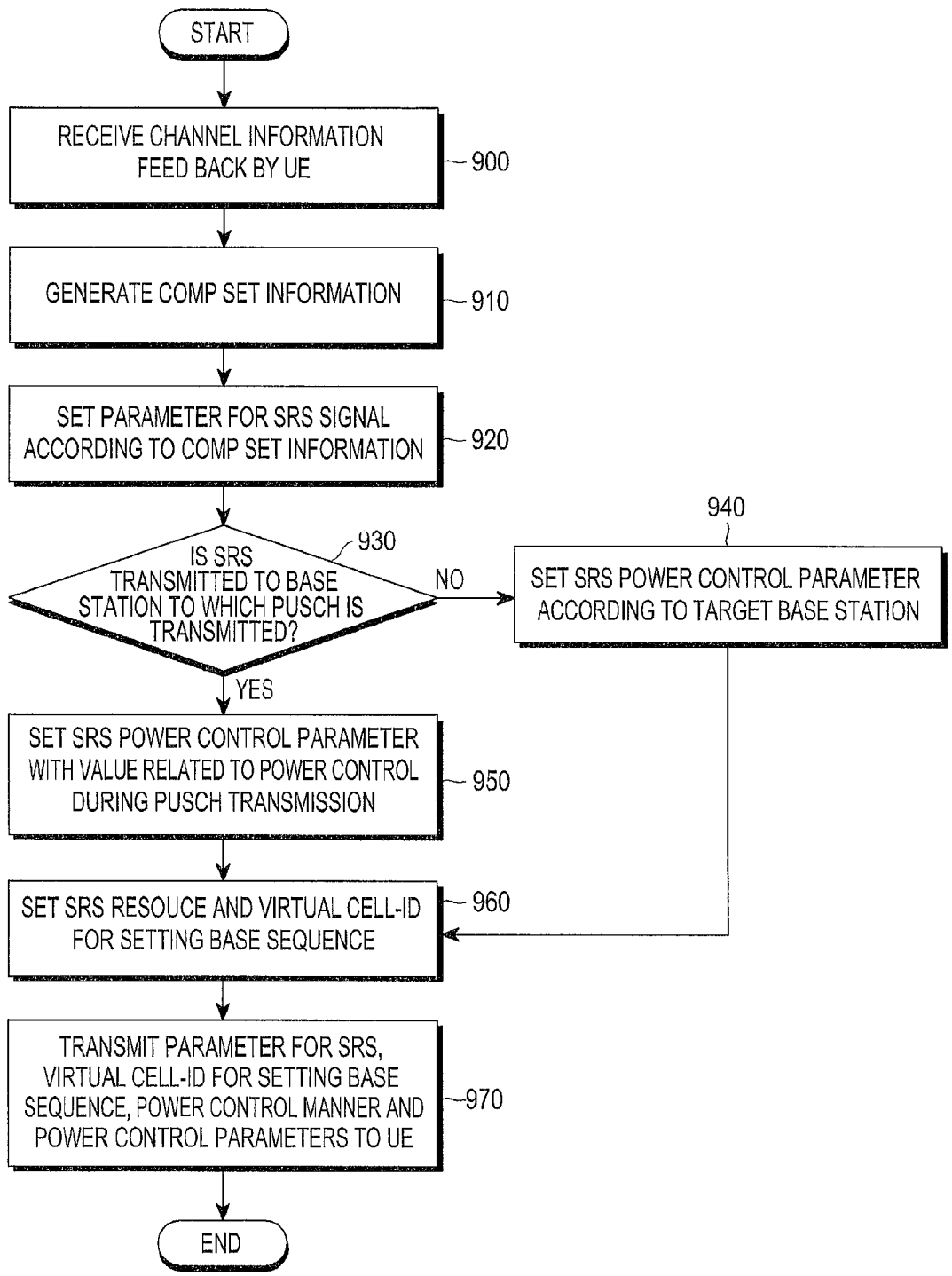
FIG. 9 is a flowchart illustrating an operation a base station for supporting an SRS transmission according to an exemplary embodiment of the present disclosure.

FIG. 9 is a flowchart illustrating an operation the base station for setting the SRS parameters in the CoMP system according to an exemplary embodiment of the present disclosure. Hereinafter, the base station may be the central control device, the macro base station, the pico base station or the RRH according to the position of the UE or the uplink/downlink transmission setting.

Referring to FIG. 9, the base station receives information with respect to a channel with the base stations capable of providing a cooperative communication in a multiple cell communication system, from the UE, in step 900. For example, the channel information may be the long-term channel information. The UE may measure the information such as the RSRP and feedback the information to the base station. In step 910, the base station generates CoMP set information based on the received channel information. In step 920, the base station set the SRS parameters depending on the destination, according to the CoMP set information.

In step 930, the base station determines whether the SRS is transmitted to the base station to which the uplink PUSCH data is transmitted, in setting the plurality of SRSs in the CoMP system. When the SRS is transmitted to the base station to which the uplink PUSCH is transmitted, the base station sets the SRS power control parameters with a value related to the power control during the PUSCH transmission, in step 950. In contrast, when the SRS is transmitted to the base station to which the uplink PUSCH is not transmitted, the base station sets new SRS power control parameters related to the power control so that a destination base station receives the SRS, in step 940. In addition, in step 960, the virtual cell ID for setting initial values of the SRS parameters and the SRS base sequence are determined. In step 970, the base station transmits the set SRS signal related setting parameters to the UE.

In an exemplary embodiment described hereinafter, when an SRS is non-periodically transmitted, an SRS transmission by the present disclosure is described. In the case wherein the SRS is transmitted non-periodically, when an SRS request field is triggered in a downlink control channel (e.g. PDDCH/ePDCCH) carrying Downlink Control Information (DCI), a UE transmits the SRS by using SRS parameters set through a higher layer such as an RRC. Each of a DCI format 0 (DCI0) and DCI format 1A/2B/2C provided in an LTE system is based on one SRS parameter set, and a DCI format 4 has three SRS parameter sets. The base station selects the SRS parameter set by the SRS request field, and the UE transmits the SRS according to a corresponding SRS parameter set.

In the CoMP system where the plurality of base stations cooperatively transmits or receives the data, the virtual cell ID for initializing the SRS parameter and the SRS sequence and the power control parameters may be different according to the destination of the SRS. For example, in the DCI format 4, when the SRS sequence field is set as "01", the SRS may be transmitted based on the SRS parameter set (e.g. an srs-AntennaPortAp-r10, an srs-BandwidthAp-r10, freqDomainPositionAp-r10, a transmissionCombAp-r10, a cyclicShiftAp-r10 and so on) set through the RRC signaling of the higher layer.

In an exemplary embodiment described hereinafter, an additional field is inserted into the SRS parameter set to be used in setting the virtual cell ID for setting the initial value of the SRS base sequence. Specifically, the base station informs the set of the virtual cell ID to the UE through the RRC signaling of the higher layer, and informs the virtual cell ID to the UE by instructing the index with respect to the setting values in the set through an additional field transmitted to a downlink control channel.

As an exemplary embodiment which may be selected, the power control parameters for transmitting the SRS may be further set. Specifically, the base station informs the set of the power control parameters to the UE through the RRC signaling of the higher layer, and informs the power control parameters to the UE by instructing the index with respect to the setting values in the set through the additional field transmitted to the downlink control channel.

As another exemplary embodiment, the base station may combine at least two information among the information described above, inform the combined information to the UE through the higher layer, and inform an index of the combined information to the UE through the downlink control channel.

FIG. 10 illustrates the SRS request field in the DCI format 4 according to an exemplary embodiment of the present disclosure. As shown in FIG. 10, the SRS parameter set, the virtual cell ID for setting the initial value of the SRS base sequence and the sets with respect to the SRS power control parameters are informed to the UE through the higher layer. The base station informs an index with respect to the selected set, through the SRS request field transmitted through the downlink control channel.

In the shown exemplary embodiment, a value "01" of the SRS request field indicates a first SRS parameter set, a first virtual cell ID for setting the base sequence and a power control reference number #1 indicating a first set of the power control parameters among the information informed through the higher layer. A value "10" of the SRS request field indicates a second SRS parameter set, a second virtual cell ID for setting the base sequence and a power control reference number #2 indicating a second set of the power control parameters among the information informed through the higher layer. A value "11" of the SRS request field indicates a third SRS parameter set, a third virtual cell ID for setting the base sequence and a power control reference number #3 indicating a third set of the power control parameters among the information informed through the higher layer.

Figure 11:
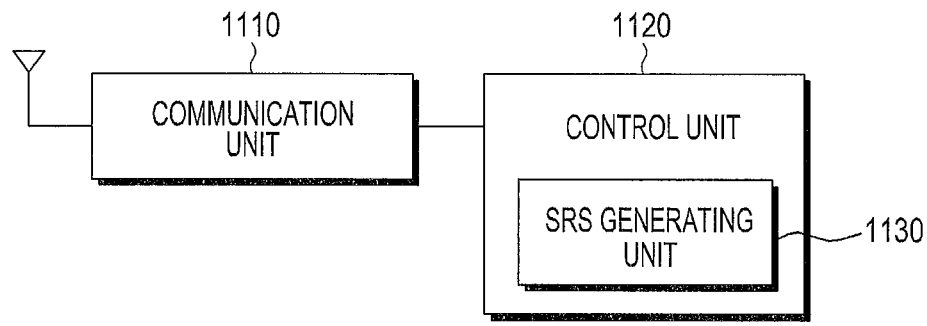
FIG. 11 is a block diagram illustrating a configuration of a UE according to an exemplary embodiment of the present disclosure.

FIG. 11 is a block diagram illustrating a configuration of a UE according to an exemplary embodiment of the present disclosure. As shown in FIG. 11, the UE includes a communication unit 1110 and a control unit 1120.

Referring to FIG. 11, the communication unit 1110 transmits or receives data or a signaling to or from the outside, specially the base station. Specifically, the communication unit 1110 forms and transmits an SRS under a control of the control unit 1120. The control unit 1120 controls states and operations of all elements forming the UE. The control unit 1120 generates feedback information for a cooperative communication according to a communication state between the UE and a cell, and feedback channel information between the UE and the cell to a central control device. An SRS generating unit 1130 included in the control unit 1120 generates an SRS according to parameters with respect to the SRS received from the central control device. The generated SRS is transmitted through the communication unit 1110.

Specifically, the SRS generating unit 1130 obtains the information with respect to the SRS parameters received from the central control device, the virtual cell ID for setting the initial value of the SRS base sequence and the parameters for the SRS power control, and generates the SRS according to these.

Here, although the above description is based on an assumption that the UE is configured by the communication unit 1110 and the control unit 1120, the present disclosure is not limited to the described configuration. That is, the UE may further include various elements according to the functions executed by the UE. For example, the UE may include a display unit for displaying a current state of the UE, an input unit through which a signal for execution of a function is input by a user, and a storage unit for storing data generated in the UE.

Figure 12:
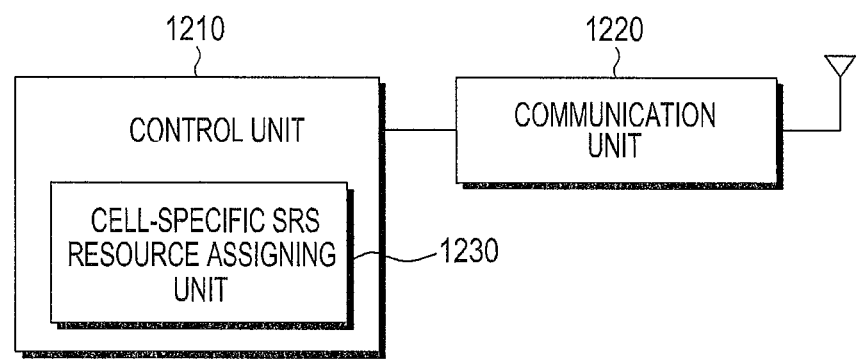
FIG. 12 is a block diagram illustrating a central control device according to an exemplary embodiment.

FIG. 12 is a view illustrating a configuration of a central control device according to an exemplary embodiment of the present disclosure. As shown in FIG. 12, the central control device includes a control unit 1210 and a communication unit 1220.

Referring to FIG. 12, the control unit 1210 controls states and operations of all elements forming the central control device. Specifically, the control unit 1210 informs cell-specific Channel State Information Reference Signal (CSI-RS) information and information related to the CoMP set to a UE. The control unit 1210 further includes an SRS resource assigning unit 1230 providing SRS parameters for an SRS transmission of the UE based on channel information fed back by the UE.

The SRS resource assigning unit 1230 assigns the SRS resource used for the SRS transmission of the UE in each of the base stations (i.e. the cells) in the macro area, and forms the SRS parameters. When the SRS is transmitted to a base station to which the uplink PUSCH is transmitted, the SRS resource assigning unit 1230 determines the SRS parameters, the virtual cell ID for setting the initial value of the SRS base sequence and the SRS power control parameters related to the power control in the uplink PUSCH transmission. When the SRS is transmitted to a base station to which the uplink PUSCH is not transmitted, the SRS resource assigning unit 1230 determines the SRS parameters, the virtual cell ID for setting the initial value of the SRS base sequence and an additional SRS power control parameters independent from the power control in the uplink PUSCH transmission.

The communication unit 1220 transmits or receives the SRS and the data to or from the terminal and a lower cell managed by the communication unit 1220. The communication unit 1220 transmits the parameters for the SRS transmission under a control of the control unit 1210, and receives the SRS for obtaining the channel information from the UE in case of need.

Embodiments of the present disclosure disclosed in the specification and the drawings are only particular examples to easily describe the technical matters of the present disclosure and assist in the understanding of the present disclosure, and do not limit the scope of the present disclosure. It is apparent to those skilled in the art that other modified examples based on the technical idea of the present disclosure can be implemented as well as the embodiments disclosed herein.

The invention claimed is:

1. A method for transmitting a Sounding Reference Signal (SRS) in a cooperative communication system, the method comprising:
    receiving SRS resource information indicating a transmission resource of an SRS to be transmitted by a user equipment (UE), from a macro base station;
    transmitting the SRS and uplink data based on a UE-specific SRS subframe configuration included in the SRS resource information when the SRS resource information includes UE-specific SRS subframe configuration information; and
    transmitting the SRS and the uplink data based on a pre-stored cell-specific SRS subframe configuration when the SRS resource information does not include the UE-specific SRS subframe configuration information,
    wherein one of one or more remote radio heads (RRHs) for the macro base station is selected as a destination of the SRS to be transmitted by the UE, the SRS resource information includes the UE-specific SRS subframe configuration information of the one of the one or more RRHs for the macro base station selected as the destination of the SRS, and
    wherein the UE-specific SRS subframe configuration information allows a last SC-FDMA symbol of a subframe to be used in transmitting the uplink data, when the uplink data is transmitted in the subframe in which the SRS is not transmitted.

2. A method for supporting a transmission of a Sounding Reference Signal (SRS) in a cooperative communication system, the method comprising:
    generating SRS resource information not including User Equipment-specific (UE-specific) SRS subframe configuration information, when a destination of the SRS is selected as a macro base station;
    generating SRS resource information including the UE-specific SRS subframe configuration information of one of one or more remote radio heads (RRHs) for the macro base station selected as the destination of the SRS, when the one of the one or more RRHs for the macro base station is selected as the destination of the SRS to be transmitted by the UE;
    transmitting the SRS resource information to the UE; and
    receiving at least one of the SRS and uplink data from the UE based on the SRS resource information,
    wherein the UE-specific SRS subframe configuration information allows a last SC-FDMA symbol of a subframe to be used in transmitting the uplink data, when the uplink data is transmitted in the subframe in which the SRS is not transmitted.

3. The method as claimed in claim 2, wherein the UE-specific SRS subframe configuration information allows a last SC-FDMA symbol of the subframe to be used in transmitting the uplink data, when the uplink data is transmitted in the subframe in which the SRS is not transmitted.

4. The method as claimed in claim 2, further comprising:
    transmitting cell-specific SRS subframe configuration information to the UE from the macro base station, before transmitting the SRS resource information to the UE; and
    transmitting channel quality information measured from the macro base station and a corresponding related base station according to the cell-specific SRS subframe configuration information, to the macro station from the base station,
    wherein the channel information is used in selecting the destination where the SRS is transmitted.

5. The method as claimed in claim 2, wherein the SRS resource information is transmitted through a Physical Data Control Channel(PDCCH)/Enhanced PDCCH(ePDCCH), or is transmitted through a higher layer signaling.

6. The method as claimed in claim 1, further comprising:
    transmitting cell-specific SRS subframe configuration information to the UE from the macro base station, before transmitting the SRS resource information to the UE; and
    transmitting channel quality information measured from the macro base station and a corresponding related base station according to the cell-specific SRS subframe configuration information, to the macro station from the base station,
    wherein the channel information is used in selecting the destination where the SRS is transmitted.

7. The method as claimed in claim 1, wherein the SRS resource information is transmitted through a Physical Data Control Channel(PDCCH)/Enhanced PDCCH(ePDCCH), or is transmitted through a higher layer signaling.

8. An apparatus for transmitting a Sounding Reference Signal (SRS) in a cooperative communication system, the apparatus comprising:
   a receiver configured to:
   receive SRS resource information indicating a transmission resource of an SRS to be transmitted by a user equipment (UE), from a macro base station; and
   a transmitter configured to:
   transmit the SRS and uplink data based on a UE-specific SRS subframe configuration included in the SRS resource information when the SRS resource information includes UE-specific SRS subframe configuration information; and
   transmit the SRS and the uplink data based on a pre-stored cell-specific SRS subframe configuration when the SRS resource information does not include the UE-specific SRS subframe configuration information,
   wherein one of one or more remote radio heads (RRHs) for the macro base station is selected as a destination of the SRS to be transmitted by the UE, the SRS resource information includes the UE-specific SRS subframe configuration information of the one of the one or more RRHs for the macro base station selected as the destination of the SRS, and
   wherein the UE-specific SRS subframe configuration information is configured to allow a last SC-FDMA symbol of a subframe to be used in transmitting the uplink data, when the uplink data is transmitted in the subframe in which the SRS is not transmitted.

9. The apparatus as claimed in claim 8, wherein the transmitter is further configured to:
   transmit cell-specific SRS subframe configuration information to the UE from the macro base station, before transmitting the SRS resource information to the UE; and
   transmit channel quality information measured from the macro base station and a corresponding related base station according to the cell-specific SRS subframe configuration information, to the macro station from the base station,
   wherein the channel information is used in selecting the destination where the SRS is transmitted.

10. The apparatus as claimed in claim 8, wherein the SRS resource information is configured to be transmitted through a Physical Data Control Channel(PDCCH)/Enhanced PDCCH(ePDCCH), or is configured to be transmitted through a higher layer signaling.

11. An apparatus for supporting a transmission of a Sounding Reference Signal (SRS) in a cooperative communication system, the apparatus comprising:
    a processor configured to:
    generate SRS resource information not including User Equipment-specific (UE-specific) SRS subframe configuration information, when a destination of the SRS is selected as a macro base station, and
    generate SRS resource information including the UE-specific SRS subframe configuration information of one of one or more remote radio heads (RRHs) for the macro base station selected as the destination of the SRS, when the one of the one or more RRHs for the macro base station is selected as the destination of the SRS to be transmitted by the UE; and
    a transmitter configured to:
    transmit the SRS resource information to the UE, and
    a receiver configured to:
    receive at least one of the SRS and uplink data from the UE based on the SRS resource information,
    wherein the UE-specific SRS subframe configuration information is configured to allow a last SC-FDMA symbol of a subframe to be used in transmitting the uplink data, when the uplink data is transmitted in the subframe in which the SRS is not transmitted.

12. The apparatus as claimed in claim 11, wherein the transmitter is further configured to:
    transmit cell-specific SRS subframe configuration information to the UE from the macro base station, before transmitting the SRS resource information to the UE; and
    transmit channel quality information measured from the macro base station and a corresponding related base station according to the cell-specific SRS subframe configuration information, to the macro station from the base station,
    wherein the channel information is used in selecting the destination where the SRS is transmitted.

13. The apparatus as claimed in claim 11, wherein the SRS resource information is configured to be transmitted through a Physical Data Control Channel(PDCCH)/Enhanced PDCCH(ePDCCH), or is configured to be transmitted through a higher layer signaling.

* * * * *